(12) United States Patent
Yuan et al.

(10) Patent No.: US 12,378,366 B1
(45) Date of Patent: Aug. 5, 2025

(54) OXIDANT FOR HUMIC ACID MODIFICATION AND METHOD FOR PREPARING HUMIC ACID RICH IN CARBOXYL GROUPS

(71) Applicant: INSTITUTE OF AGRICULTURAL RESOURCES AND REGIONAL PLANNING, CAAS, Beijing (CN)

(72) Inventors: Liang Yuan, Beijing (CN); Yanting Li, Beijing (CN); Bingqiang Zhao, Beijing (CN); Shuiqin Zhang, Beijing (CN); Meng Xu, Beijing (CN); Jiukai Xu, Beijing (CN); Yingqiang Zhang, Beijing (CN)

(73) Assignee: INSTITUTE OF AGRICULTURAL RESOURCES AND REGIONAL PLANNING, CAAS, Beijing (CN)

( * ) Notice: Subject to any disclaimer, the term of this patent is extended or adjusted under 35 U.S.C. 154(b) by 0 days.

(21) Appl. No.: 19/031,774

(22) Filed: Jan. 18, 2025

(30) Foreign Application Priority Data

Jun. 5, 2024 (CN) .......................... 202410722101.3

(51) Int. Cl.
*C08H 7/00* (2011.01)
*B01J 23/755* (2006.01)
*B01J 37/02* (2006.01)

(52) U.S. Cl.
CPC .............. *C08H 6/00* (2013.01); *B01J 23/755* (2013.01); *B01J 37/0209* (2013.01)

(58) Field of Classification Search
CPC .................................. C08H 6/00; B01J 23/755
See application file for complete search history.

(56) References Cited

U.S. PATENT DOCUMENTS

| | | | | |
|---|---|---|---|---|
| 4,696,749 A | * | 9/1987 | Habermann | C02F 1/725 210/759 |
| 5,026,416 A | * | 6/1991 | Alexander | C05F 11/02 71/DIG. 2 |
| 5,034,045 A | * | 7/1991 | Alexander | C05F 11/02 71/DIG. 2 |
| 5,688,999 A | * | 11/1997 | Lebo, Jr. | C08H 99/00 562/475 |
| 2012/0125064 A1 | * | 5/2012 | Joseph | C10B 53/02 366/147 |
| 2014/0154168 A1 | * | 6/2014 | Blanco Brieva | B01J 31/069 556/428 |
| 2020/0377970 A1 | * | 12/2020 | Morris | C22B 11/04 |
| 2021/0395161 A1 | * | 12/2021 | Yuan | C05G 3/90 |

FOREIGN PATENT DOCUMENTS

| | | |
|---|---|---|
| CN | 115160082 A | 10/2022 |
| CN | 115445620 A | 12/2022 |

OTHER PUBLICATIONS

Wu et al. (Journal of Hazardous Materials 179 (2010) 533-539) (Year: 2010).*

* cited by examiner

*Primary Examiner* — Liam J Heincer

(57) ABSTRACT

An oxidant for humic acid modification and a method for preparing humic acid rich in carboxyl groups are provided. The oxidant used for humic acid modification includes cobalt-nickel catalyst loaded on biochars and hydrogen peroxide solutions. When preparing humic acid rich in carboxyl groups, first dissolving the humic acid in a 2 wt % sodium hydroxide solution to prepare a sodium humate solution; then, under stirring conditions, adding the oxidant used for humic acid modification to the sodium humate solution and react at 45-55° C. for 90-150 minutes; then freeze-drying to obtain the final product. The present disclosure selectively breaks and destroys the aromatic carbon structure of humic acid by using cobalt-nickel catalyst loaded on biochar in combination with hydrogen peroxide solution, and avoids the release of carbon dioxide generated by excessive oxidation of humic acid carbon structure, thereby directionally increasing the carboxyl content of humic acid.

6 Claims, 5 Drawing Sheets

OXIDANT FOR HUMIC ACID MODIFICATION AND METHOD FOR PREPARING HUMIC ACID RICH IN CARBOXYL GROUPS

CROSS-REFERENCE TO RELATED APPLICATIONS

This application claims to the benefit of priority from Chinese Application No. 202410722101.3 with a filing date of Jun. 5, 2024. The content of the aforementioned applications, including any intervening amendments thereto, are incorporated herein by reference.

TECHNICAL FIELD

The present disclosure relates to the technical field of humic acid modification, in particular to an oxidant for humic acid modification and a method for preparing humic acid rich in carboxyl groups.

BACKGROUND

Nitrogen is an essential nutrient for plant growth and one of the important factors affecting crop yield. Urea, as the main nitrogen fertilizer variety in China, accounts for 65% of the total nitrogen fertilizer. However, urea is easily decomposed by urease after being applied to the soil, resulting in losses through ammonia volatilization, nitrification-denitrification, leaching, and runoff, leading to a decrease in urea utilization efficiency and environmental pollution.

Humic acid is a natural organic polymer substance rich in functional groups such as carboxyl, phenolic hydroxyl, alcohol hydroxyl, amino, amide, methoxy, etc. It has a macromolecular network structure, high cation exchange capacity, and strong physical adsorption capacity. Carboxyl group is a key structural factor in the function of humic acid, by combining and adsorbing urea, it can improve the stability of urea, slow down the conversion rate of urea, retain $NH_4^+$ in soil, reduce ammonia volatilization loss, and promote plant growth, maintain water and nutrition, prevent and control diseases, playing an important role and significance in agricultural production.

Oxidative modification of humic acid is an important way to increase its carboxyl content. The use of oxidants (such as hydrogen peroxide, nitric acid, air oxygen, potassium permanganate, etc.) to oxidize humic acid can destroy its molecular structure, promote the breaking of chemical bonds in some branches of humic acid to form small molecular structures, so that it can increase the oxygen content and biological activity of humic acid to some extent. However, there is a disorder in the modification direction when oxidant modification is used alone, which will damage other functional groups and overall structure of humic acid, making it difficult to conduct directional modification on the inert structure (benzene ring) of humic acid to increase its carboxyl content.

SUMMARY

In view of the existing technology mentioned above, the present disclosure provides an oxidant for humic acid modification and a method for preparing humic acid rich in carboxyl groups, in order to solve the technical problem of difficulty to directional modification of the inert structure of humic acid to increase its carboxyl content.

In order to achieve the above objectives, the technical solution adopted by the present disclosure is to provide an oxidant for humic acid modification, and the oxidant includes a biochar supported directional modification and a hydrogen peroxide solution.

On the basis of the above technical solution, the present disclosure can also be improved as follows.

Further, the mass concentration of the hydrogen peroxide solution is 0.5%.

Further, the solid-liquid ratio of the cobalt-nickel catalyst loaded on biochar to the hydrogen peroxide solution is 1 g: 75-85 mL.

Further, the cobalt-nickel catalyst loaded on biochar is prepared through the following steps:
 S1, dissolving cobalt salt and nickel salt in water to obtain a mixed solution;
 S2, adding biochar into the mixed solution under stirring condition, regulating a pH of a system to 10-11, reacting for 10-15 hours at 110-130° C., and then washing and drying to obtain the cobalt-nickel catalyst loaded on biochar.

Further, the cobalt salt is $Co(NO_3)_2 \cdot 6H_2O$; the nickel salt is $Ni(NO_3)_2 \cdot 6H_2O$; concentrations of $Co(NO_3)_2 \cdot 6H_2O$ and $Ni(NO_3)_2 \cdot 6H_2O$ in the mixed solution are 60 mM and 12 mM, respectively.

Further, the mass ratio of biochar to $Co(NO_3)_2 \cdot 6H_2O$ is 1:1.15.

Further, the reaction temperature in S2 is 120° C. and the reaction time is 12 hours.

In addition, the present disclosure provides a method for preparing humic acid rich in carboxyl groups using the oxidant for humic acid modification mentioned above, which includes the following steps:
 (1) dissolving a humic acid in a 2 wt % sodium hydroxide solution to prepare a sodium humate solution with a concentration of 0.1-0.2 g/mL;
 (2) adding the oxidant for humic acid modification to the sodium humate solution under stirring conditions, and reacting at 45-55° C. for 90-150 minutes; then cooling in an ice water bath to room temperature;
 (3) separating liquid, and then freeze-drying to obtain a humic acid rich in carboxyl groups.

Further, the amount of the oxidant for humic acid modification is 1:100 based on a mass ratio of the cobalt-nickel catalyst loaded on biochar to the humic acid.

Further, in step (2), the reaction temperature is 50° C. and the reaction time is 120 minutes. The advantageous effects of the present disclosure are as follows:
 1. The present disclosure selectively breaks and destroys the aromatic carbon (benzene ring) structure of humic acid by using biochar supported directional modification in combination with hydrogen peroxide solution, and avoids the release of carbon dioxide generated by excessive oxidation of humic acid carbon structure, thereby selectively increasing the carboxyl content of humic acid.
 2. When humic acid treated with the oxidant in the present disclosure is mixed with urea, it can effectively reduce the ammonia volatilization loss of urea.

DETAILED DESCRIPTION OF THE EMBODIMENTS

Figure 1:
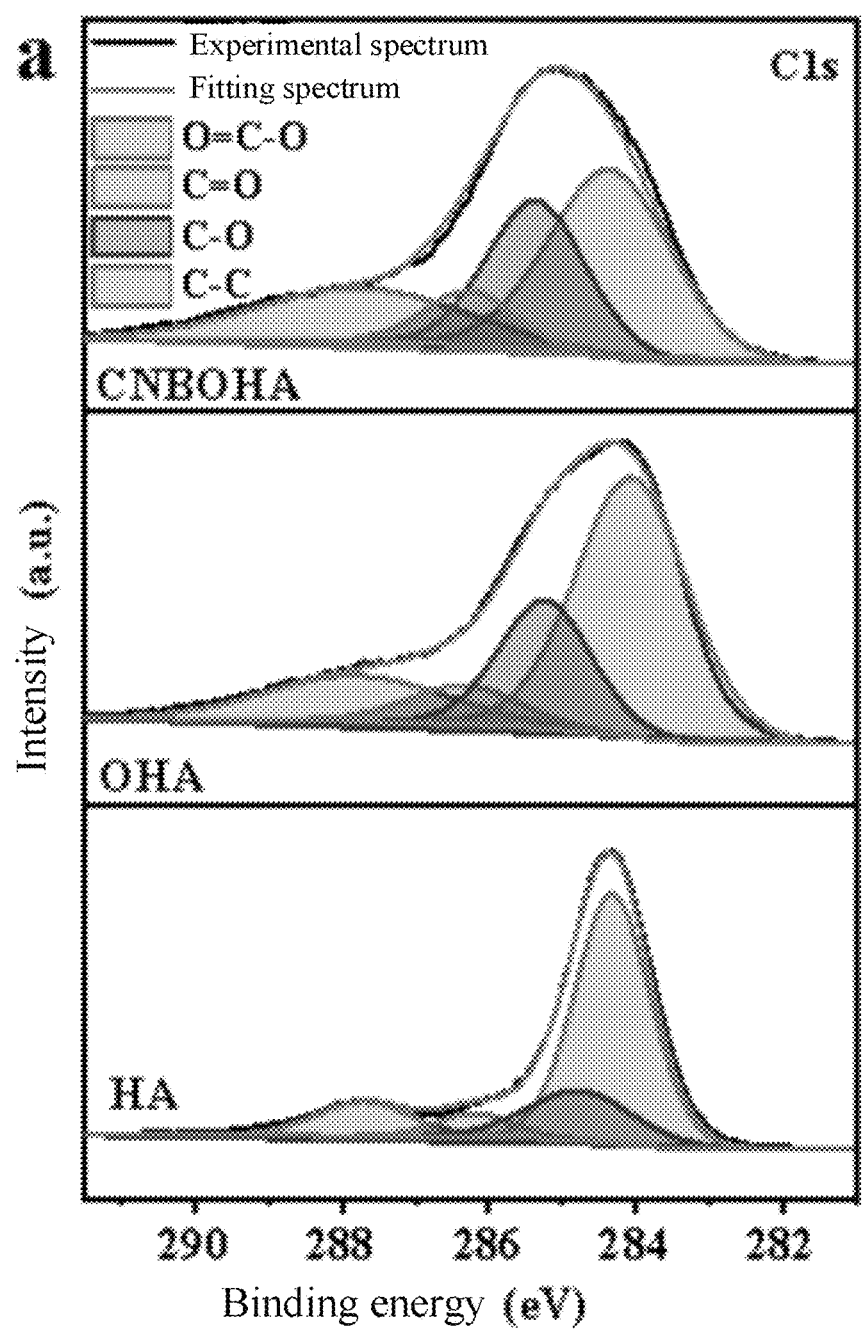
FIG. 1 shows the XPS C1s (a) peak fitting curves of HA, OHA, and CNBOHA.

The specific implementation methods of the present disclosure will be described in detail below in conjunction with the embodiments.

Embodiment 1

An oxidant for humic acid modification, including a cobalt-nickel catalyst loaded on biochar and a hydrogen peroxide solution, wherein the solid-liquid ratio of the cobalt-nickel catalyst loaded on biochar to the hydrogen peroxide solution is 1 g: 80 mL, the mass concentration of the hydrogen peroxide solution is 0.5%. The cobalt-nickel catalyst loaded on biochar is prepared through the following steps:

S1: Dissolve 1.7463 g of $Co(NO_3)_2 \cdot 6H_2O$ and 0.3489 g of $Ni(NO_3)_2 \cdot 6H_2O$ in 100 mL of deionized water to obtain a mixed solution;

S2: Add 2 g of biochar (BC) to the mixed solution under stirring conditions, then regulate the pH of the system to 11 with 3 mol/L NaOH solution, then place the pH regulated system in a muffle furnace to react at 120° C. for 12 hours, filter after reaction completed, then wash the solid with deionized water until neutral, and then dry at 60° C. to obtain the cobalt-nickel catalyst loaded on biochar (Co—Ni@BC).

Embodiment 2

An oxidant for humic acid modification, including a cobalt-nickel catalyst loaded on biochar and a hydrogen peroxide solution, wherein the solid-liquid ratio of the cobalt-nickel catalyst loaded on biochar to the hydrogen peroxide solution is 1 g: 75 mL, the mass concentration of the hydrogen peroxide solution is 0.5%. The cobalt-nickel catalyst loaded on biochar is prepared through the following steps:

S1: Dissolve 1.747 g of $Co(NO_3)_2 \cdot 6H_2O$ and 0.35 g of $Ni(NO_3)_2 \cdot 6H_2O$ in 100 mL of deionized water to obtain a mixed solution;

S2: Add 2 g of biochar (BC) to the mixed solution under stirring conditions, then regulate the pH of the system to 10 with 3 mol/L NaOH solution, then place the pH regulated system in a muffle furnace to react at 110° C. for 15 hours, filter after reaction completed, then wash the solid with deionized water until neutral, and then dry at 60° C. to obtain the cobalt-nickel catalyst loaded on biochar (Co—Ni@BC).

Embodiment 3

An oxidant for humic acid modification, including a cobalt-nickel catalyst loaded on biochar and a hydrogen peroxide solution, wherein the solid-liquid ratio of the cobalt-nickel catalyst loaded on biochar to the hydrogen peroxide solution is 1 g: 85 mL, the mass concentration of the hydrogen peroxide solution is 0.5%. The cobalt-nickel catalyst loaded on biochar is prepared through the following steps:

S1: Dissolve 1.752 g of $Co(NO_3)_2 \cdot 6H_2O$ and 0.349 g of $Ni(NO_3)_2 \cdot 6H_2O$ in 100 mL of deionized water to obtain a mixed solution;

S2: Add 2 g of biochar (BC) to the mixed solution under stirring conditions, then regulate the pH of the system to 10.5 with 3 mol/L NaOH solution, then place the pH regulated system in a muffle furnace to react at 130° C. for 10 hours, filter after reaction completed, then wash the solid with deionized water until neutral, and then dry at 60° C. to obtain the cobalt-nickel catalyst loaded on biochar (Co—Ni@BC).

Experimental Example

The performance of the oxidant for humic acid modification prepared in the three embodiments of the present disclosure is similar. Taking the oxidant for humic acid modification prepared in Embodiment 1 as an example, the performance of the oxidant for humic acid modification will be explained.

Using the oxidant for humic acid modification to conduct directional catalytic oxidation modification on humic acid to prepare humic acid rich in carboxyl groups. The specific steps are as follows:

Dissolve 10 g of humic acid sample in 92 mL of sodium hydroxide solution with a concentration of 2 wt %, then add 0.1 g Co—Ni@BC of the oxidant for humic acid modification into the sodium humate solution under continuous stirring condition, then add 5% $H_2O_2$ solution (8 mL) and mix well, and then react at 50° C. for 2 hours. After the reaction was completed, immediately place the reaction system in ice water for rapid cooling to prevent the reaction from continuing. When the temperature is lowered to room temperature, solid-liquid separation was carried out to collect the reaction solution, and the collected solution was freeze-dried to obtain the humic acid rich in carboxyl groups, which is referred to as CNBOHA.

Meanwhile, using $H_2O_2$ solution as the oxidant to oxidize humic acid, the specific steps are as follows:

Dissolve 10 g of humic acid sample in 92 mL of sodium hydroxide solution with a concentration of 2 wt %, then add 8 mL of 5% $H_2O_2$ solution to the humic acid solution under continuous stirring condition and mix well, and then react at 50° C. for 2 hours. After the reaction is completed, immediately place the reaction system in ice water for rapid cooling to prevent the reaction from continuing. When the temperature is lowered to room temperature, solid-liquid separation was carried out to collect the reaction solution, and the collected solution was freeze-dried to obtain the oxidized humic acid, which is referred to as OHA.

Evaluate the directional modification ability of the catalyst in the present disclosure using humic acid (HA) and OHA as controls.

1. Structural Characteristics of Directionally Modified Humic Acid

The elemental composition analysis of CNBOHA, OHA, and HA is shown in Table 1. From Table 1, it can be seen that compared with HA, the oxygen content of OHA and CNBOHA increased by about 3.4%, while there was no difference in oxygen content between OHA and CNBOHA. Compared with OHA, the carbon content of CNBOHA increased by 5.0%, indicating that the use of the oxidant in the present disclosure can reduce the carbon loss from the release of carbon dioxide caused by excessive oxidation of humic acid carbon structure, thereby retaining more carbon in humic acid.

TABLE 1

Elemental composition and atomic percentage of humic acid

| Sample | Elemental Composition (wt %) | | | |
|---|---|---|---|---|
| | C | H | O | N |
| HA | 47.99 | 3.11 | 32.34 | 1.22 |
| OHA | 42.33 | 2.84 | 33.43 | 1.03 |
| CNBOHA | 44.46 | 2.82 | 33.42 | 1.02 |

Figure 2:
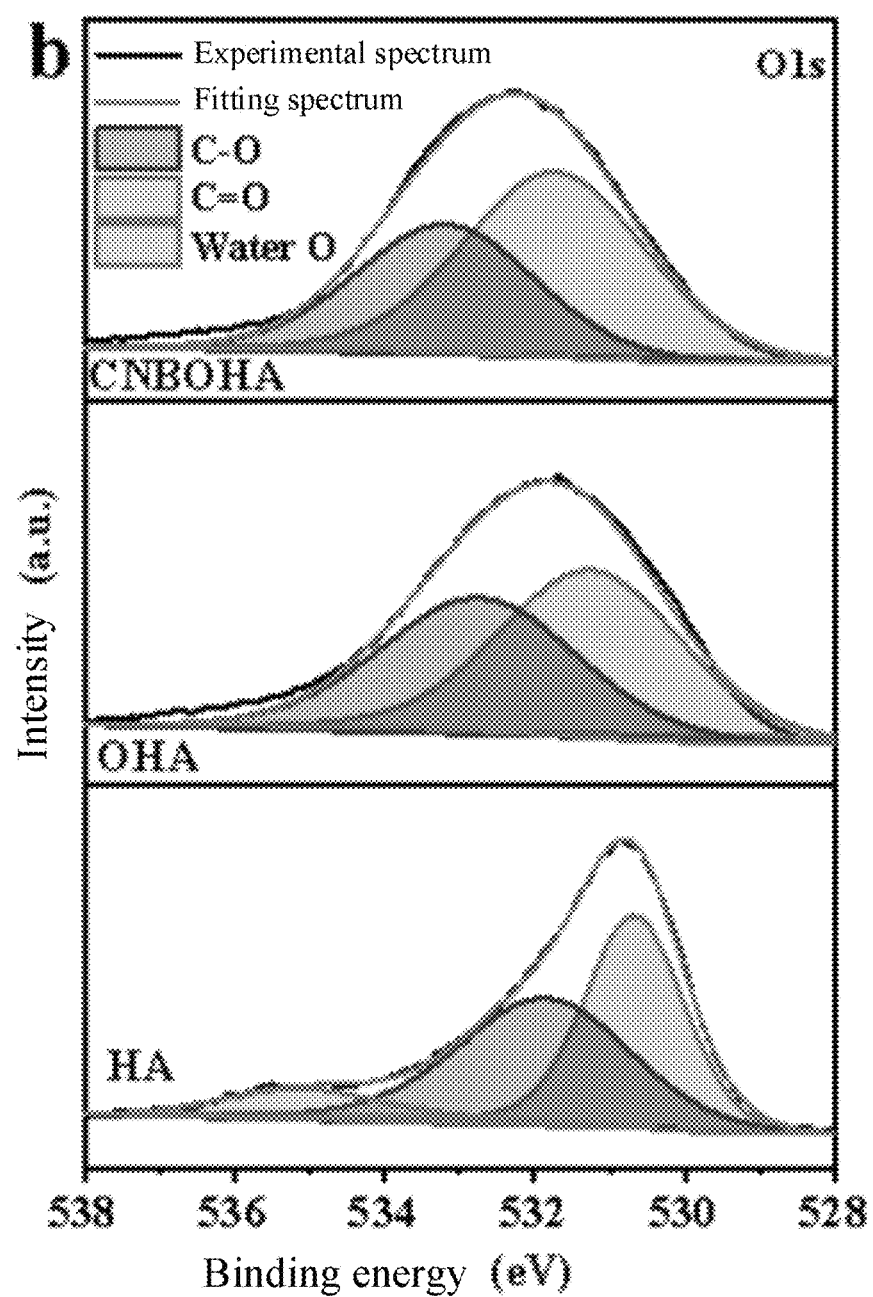
FIG. 2 shows the XPS O1s (b) peak fitting curves of HA, OHA, and CNBOHA.

C1s (FIG. 1) and O1s (FIG. 2) peak fitting were performed on CNBOHA, OHA, and HA, and the results are shown in FIG. 1 and FIG. 2, wherein FIG. 1 shows the fitting results of Cs peak, and FIG. 2 shows the fitting results of O1s peak. From FIG. 1 and FIG. 2, it can be seen that compared with HA, both OHA and CNBOHA can increase the oxygen content of humic acid, the carboxyl content (O=C—O) is increases by nearly 35.56% to 84.36%, and the C—O single bond content increases by 21.89% to 49.21%. Compared with OHA, the carboxyl content (O=C—O) of CNBOHA increases by 35.34%, the C—O single bond content increases by 22.62%, and the aromatic carbon content (C—C) decreases by 32.81%, indicating that the oxidant in the present disclosure can selectively break and destroy the aromatic carbon (benzene ring) structure of humic acid, thereby directionally increasing the carboxyl content of humic acid.

2. The Effect of Humic Acid on Soil Ammonium Nitrogen Content During Urea Ammonia Volatilization and Urea Conversion Process Three types of humic acids (HA, OHA, and CNBOHA) were added to molten urea at a temperature of 130° C. at a dosage of 0.5% (the mass of humic acid divided by the total mass of humic acid and urea), stirred for 30 seconds, cooled and crushed, and sieved through a 100 mesh sieve to obtain three types of humic acid urea HAU (corresponding to HA), OHAU (corresponding to OHA), and CNBOHAU (corresponding to CNBOHA). Using urea (U) melted without adding humic acid as a control.

0.068 g of U, HAU, OHAU, and CNBOHAU were mixed with 100 g of soil, then adding them to a culture flask. At the same time, take the treatment without fertilizer as the control (CK), adjust the soil moisture content to 20%, and cultivate in a 25° C. climate chamber in the dark. During the cultivation period, the soil moisture content was maintained at 20% by weighing method, and each treatment was repeated 3 times. On the 1st, 2nd, 3rd, 5th, and 7th day after cultivation, the sponge absorption method was used to absorb $NH_3$ to investigate the effect of humic acid on the ammonia volatilization rate and ammonia volatilization accumulation of the urea. The results are shown in FIG. 3 and FIG. 4.

Figure 3:
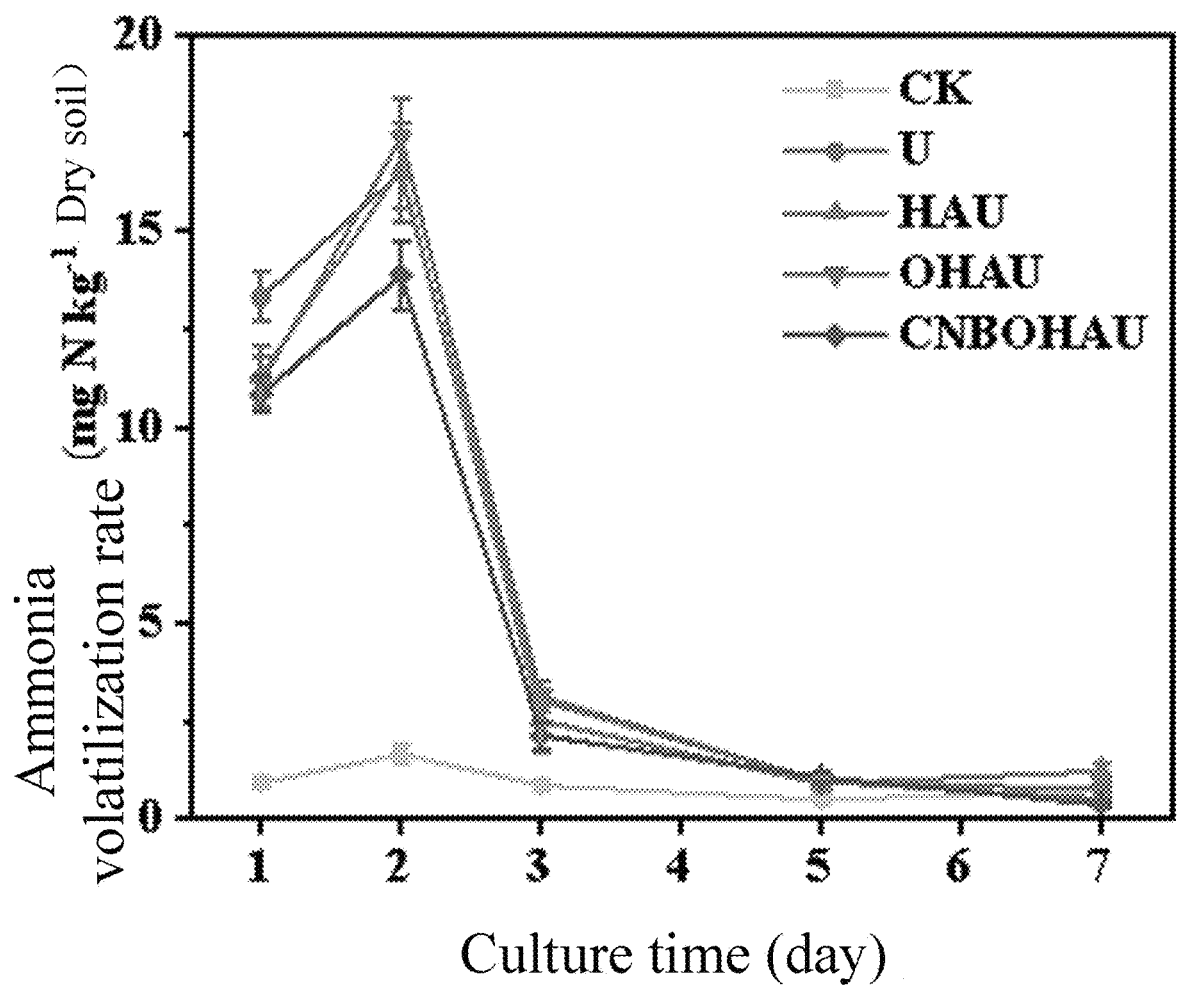
FIG. 3 shows the effect curve of different humic acids on the ammonia volatilization of urea.
Figure 4:
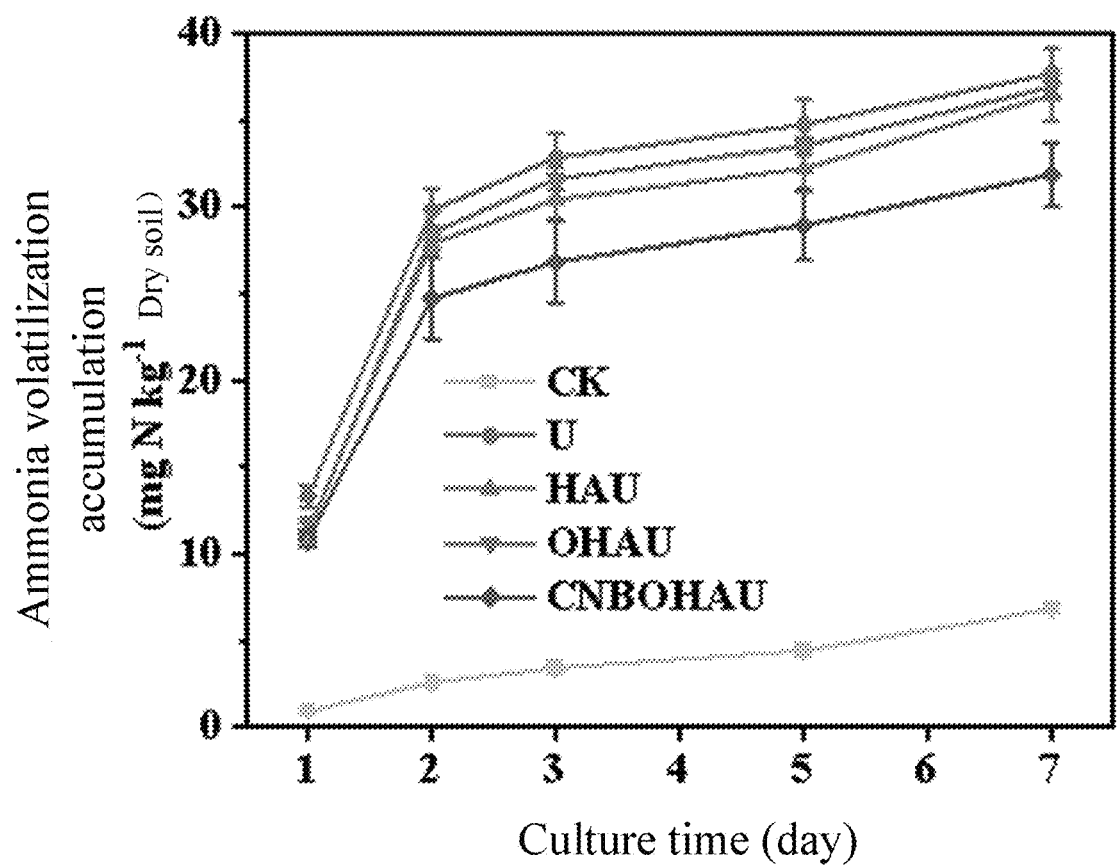
FIG. 4 shows the effect curve of different humic acids on the cumulative quantity of the ammonia volatilization of urea.

From FIG. 3 and FIG. 4, it can be seen that compared to U, humic acid urea can reduce the average ammonia volatilization rate (2.95%-17.64%) and ammonia volatilization accumulation (2.1%-16.98%). Compared with HAU, the average ammonia volatilization rate and the ammonia volatilization accumulation of OHAU increased by 2.4% and 1.3% respectively, while CNBOHAU decreased by 13.08% and 10.97% respectively, indicating that CNBOHA rich in carboxyl groups can further reduce urea ammonia volatilization loss compared to HA.

The soil ammonium nitrogen content was measured on the 1st, 2nd, 3rd, 5th, 7th, 14th, and 28th days of cultivation to investigate the effect of humic acid on soil ammonium nitrogen content during urea conversion. The results are shown in FIG. 5.

Figure 5:
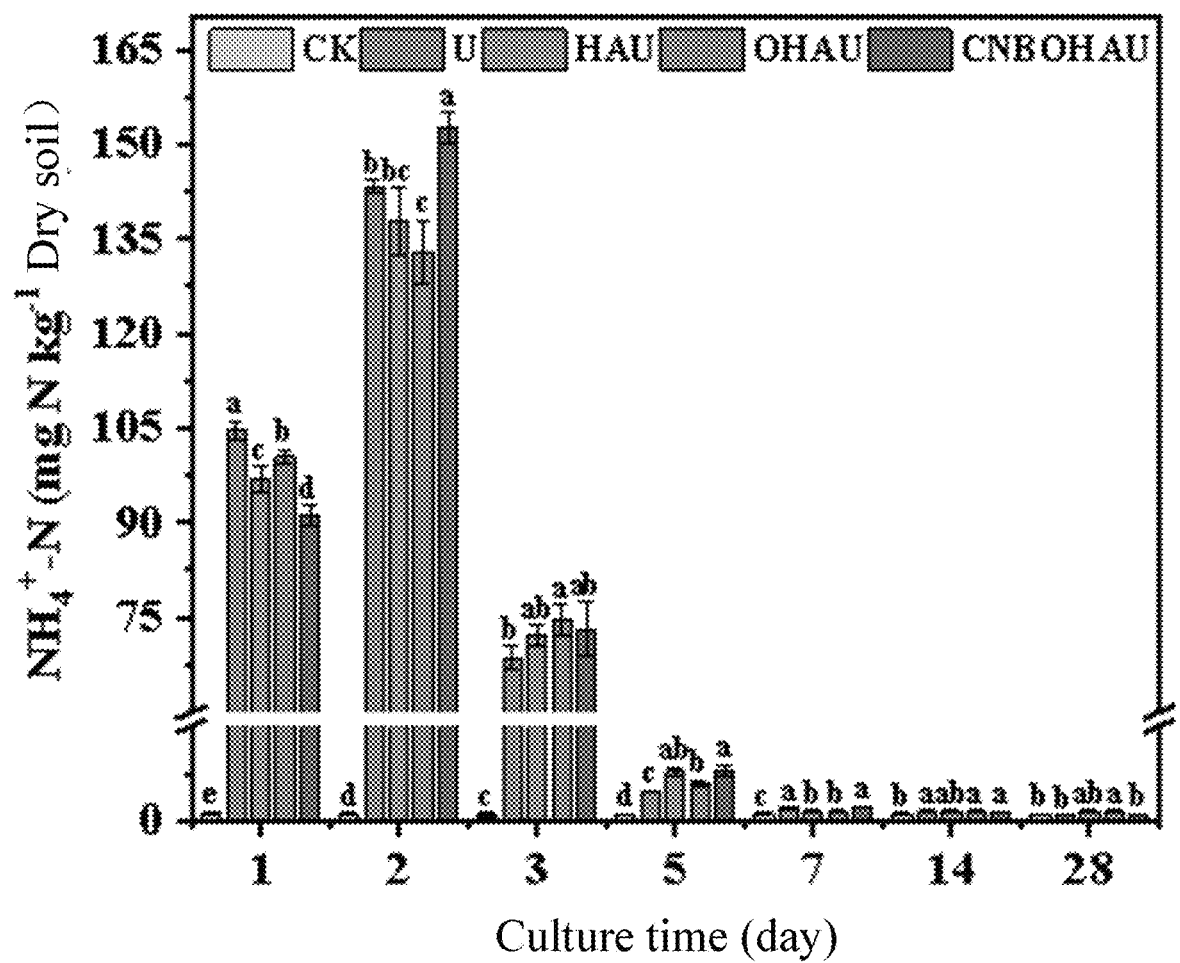
FIG. 5 shows a bar chart of the effect of different humic acids on soil ammonium nitrogen content during urea conversion process.

From FIG. 5, it can be seen that compared with U, humic acid urea showed a decrease in soil ammonium nitrogen content on the first day of cultivation, with CNBOHAU showing a further decrease in soil ammonium nitrogen content compared to HAU. During the peak period of ammonia volatilization on the second day of cultivation, CNBOHAU showed a 10.91% increase in soil ammonium nitrogen content compared to HAU, indicating that CNBOHA rich in carboxyl groups can further enhance the adsorption of soil ammonium nitrogen, retain more nitrogen in the soil, increase soil nitrogen supply intensity, and reduce urea loss.

Although the specific embodiments of the present disclosure have been described in detail in conjunction with the embodiments, they should not be regarded as limitations to the scope of the present patent. Within the scope described in the claims, various modifications and variations that can be made by skilled person in the art without creative labor still fall within the scope of this application.

What is claimed is:

1. A method for preparing humic acid rich in carboxyl groups using the oxidant for humic acid modification, wherein the oxidant for humic acid modification comprises a cobalt-nickel catalyst loaded on biochar and a hydrogen peroxide solution, a mass concentration of the hydrogen peroxide solution is 0.5%; a solid-liquid ratio of the cobalt-nickel catalyst loaded on biochar to the hydrogen peroxide solution is 1 g: 75-85 mL,
    the method comprising following steps:
    (1) dissolving a humic acid in a 2 wt % sodium hydroxide solution to prepare a sodium humate solution with a concentration of 0.1-0.2 g/mL;
    (2) adding the oxidant for humic acid modification to the sodium humate solution under stirring conditions, and reacting at 45-55° C. for 90-150 minutes; then cooling in an ice water bath to room temperature;
    (3) separating liquid, and then freeze-drying to obtain a humic acid rich in carboxyl groups;
    the cobalt-nickel catalyst loaded on biochar is prepared through following steps:
    S1, dissolving cobalt salt and nickel salt in water to obtain a mixed solution;
    S2, adding biochar into the mixed solution under stirring condition, regulating a pH of a system to 10-11, reacting for 10-15 hours at 110-130° C., and then washing and drying to obtain the cobalt-nickel catalyst loaded on biochar.

2. The method for preparing humic acid rich in carboxyl groups according to claim 1, wherein an amount of the oxidant for humic acid modification is 1:100 based on a mass ratio of the cobalt-nickel catalyst loaded on biochar to the humic acid.

3. The method for preparing humic acid rich in carboxyl groups according to claim 1, wherein a reaction temperature in step (2) is 50° C. and a reaction time is 120 minutes.

4. The method for preparing humic acid rich in carboxyl groups according to claim 1,
    wherein the cobalt salt is $Co(NO_3)_2 \cdot 6H_2O$; the nickel salt is $Ni(NO_3)_2 \cdot 6H_2O$; concentrations of $Co(NO_3)_2 \cdot 6H_2O$ and $Ni(NO_3)_2 \cdot 6H_2O$ in the mixed solution are 60 mM and 12 mM, respectively.

5. The method for preparing humic acid rich in carboxyl groups according to claim 4, wherein a mass ratio of biochar to $Co(NO_3)_2 \cdot 6H_2O$ is 1:1.15.

6. The method for preparing humic acid rich in carboxyl groups according to claim 1, wherein a reaction temperature in S2 is 120° C. and a reaction time is 12 hours.

* * * * *